(12) United States Patent
Shoemaker

(10) Patent No.: US 6,222,125 B1
(45) Date of Patent: Apr. 24, 2001

(54) ELECTRICAL INSULATOR FOR AN ELECTRICAL OUTLET

(76) Inventor: Calvin L. Shoemaker, 342 W. 71st St., #3S8, New York, NY (US) 10023

( * ) Notice: Subject to any disclaimer, the term of this patent is extended or adjusted under 35 U.S.C. 154(b) by 0 days.

(21) Appl. No.: 09/083,657

(22) Filed: May 23, 1998

Related U.S. Application Data

(63) Continuation-in-part of application No. 08/600,062, filed on Feb. 12, 1996, now abandoned.

(51) Int. Cl.[7] ............................... H02G 3/14; H05K 5/03
(52) U.S. Cl. .......................... 174/67; 220/242; 439/426
(58) Field of Search ............................. 174/67; 220/242; 277/164; 439/426, 135, 272, 136, 137, 138, 139, 140, 141, 142, 143, 144, 145

(56) References Cited

U.S. PATENT DOCUMENTS

| | | | |
|---|---|---|---|
| 3,317,881 | * | 5/1967 | Setecka ................................ 439/140 |
| 4,607,136 | * | 8/1986 | Thomas ................................. 174/67 |
| 4,618,740 | * | 10/1986 | Ray et al. .............................. 174/67 |
| 4,640,564 | * | 2/1987 | Hill ..................................... 439/137 |
| 4,733,017 | * | 3/1988 | Wolfe-Taylor et al. ............... 174/67 |
| 5,288,945 | * | 2/1994 | Bruce ................................... 174/67 |

* cited by examiner

*Primary Examiner*—Dean A. Reichard

(57) ABSTRACT

A cover for an electrical outlet, the invention prohibits the insertion of improper objects into an electrical outlet by providing a layer of insulation covering each female element of the electrical outlet. Further, the invention protects against an electrical shock during the insertion or removal of a plug by providing a thick layer of insulation surrounding the outlet. In addition, the invention protects persons and children in particular against electrical shock and prohibits insertion of foreign objects into the wall outlet with movable assemblies covering the outlet. Even further, the invention inhibits unwanted heat loss, or heat exchange in buildings.

10 Claims, 4 Drawing Sheets

ELECTRICAL INSULATOR FOR AN ELECTRICAL OUTLET

The present application is a continuation in part of U.S. patent application Ser. No. 08/600,062 filed on Feb. 12, 1996 now abandoned and claims priority thereon pursuant to 35 U.S.C. 120.

BACKGROUND OF THE INVENTION

1. Field of Invention

This invention relates to an electrical insulator for an electrical outlet specifically for insulating a person against electric shock. Further, the invention protects an electrical wall outlet from the elements of the environment and inhibits heat exchange through electrical outlets located inside or outside of buildings.

2. The Prior Art

Attempts by inventors to protect small children and grown persons against electrical shock from electrical outlets or plugs engaged therewith, a serious hazard, have had limited success functionally and commercially.

Inventors have created many contraptions in attempts to protect against electrical shock. Small plastic inserts that are placed in unused electrical outlets frequently get lost and do not protect electrical wall outlets engaged with a plug. Other inventions that attempt to protect persons against electrical shock while a plug is engaged with an electrical wall outlet have proven to be cumbersome, limited in effectiveness, and not successful commercially. Further, they have not been aesthetically pleasing to interior decor.

Thus, accordingly, the subject invention alleviates these disadvantages.

SUMMARY OF THE INVENTION

It is an object of the subject invention to protect against electrical shock from an electrical wall outlet.

Specifically, it is an object of the subject invention to protect against electrical shock from an unused electrical outlet connected to electricity.

It is further an object of the invention to protect against electrical shock from a plug that is engaged with an electrical outlet.

Even further, it is an object of the subject invention to provide thermal insulation for buildings' interior and exterior electrical outlets to prevent unwanted heat exchange.

Further, it is another object of the invention to inhibit insertion of improper objects into an electrical outlet.

Further, it is an object of the invention to protect an electrical wall outlet against the elements of the environment.

Even another object of the invention provides insulating material surrounding the electrical outlet.

Further, another object of the invention is to provide thin layers of insulating protection covering the female electrical elements of an electrical outlet.

It is another object of the invention to provide slits that partially perforate said layers of the invention.

Further, another object of the invention contemplates two movable assemblies—typically slidable extensions elements in the typical embodiment—sliding to uncover and cover the female electrical elements of an electrical outlet by squeezing to physically open.

An additional object of the subject invention proposes a method of securing the invention to the faceplate of the electrical wall outlet.

Another object of the invention is to produce a commercially successful invention, at a low cost that satisfies needs existing in the market, in an extremely safe and efficient manner.

The advantages of the invention:

Once applied to an outlet, it protects against the insertion of improper objects into the female electrical elements of an unused electrical outlet;

Once applied to an electrical outlet it protects the outlet from the environment;

Slits that only partially penetrate the layer covering the female electrical elements of an electrical outlet. An electrical outlet is thereby protected with the invention applied. At the time a plug is inserted into the outlet protected with the invention, the slits furnish guides for further penetrating the layer.

Movable assemblies that furnish solid protection against improper access to the female elements of an electrical wall outlet;

In the typical embodiment, the sides of each of the movable assemblies—slidable elements—must be squeezed simultaneously to allow a plug access to the outlet;

Further, the amount of pressure necessary to urge open either of the slidable elements sufficiently to gain access to electricity is difficult for a young child;

Additionally, the pressure necessary to urge open the slidable elements can be adjusted by the manufactured size of the sides of the slidable elements;

Use of an electrical outlet is simple after the invention is applied;

Removal of a plug is much safer and easier with the invention applied to the electrical outlet.

The insulating main body of the invention protects a person against electrical shock during the entire insertion or removal of the plug from the electricity;

Finding, fumbling with or attaching a protective device is eliminated;

The invention is completely novel, useful and unobvious;

The typical embodiment of the invention provides synergy.

BRIEF DESCRIPTION OF THE INVENTION

DETAILED DESCRIPTION OF THE INVENTION

The parts that comprise the invention: the main body 10 of compressible, insulating material surrounding an electrical outlet; a thinner layer 11 of compressible, insulating material having slits partially penetrating said thin layer 11 of insulating material that covers each of the female electrical elements 2 of said electrical outlet 15; and hard, movable assemblies 69L that cover the female electrical elements 2 of the electrical outlet 15. The movable assemblies 69L can be urged to allow access to the female electrical elements 2 of the electrical outlet 15.

Further, the invention contains a method of attaching the invention to the electrical wall outlet as well—a peel-away type adhesive is used in the typical embodiment.

Figure 1:
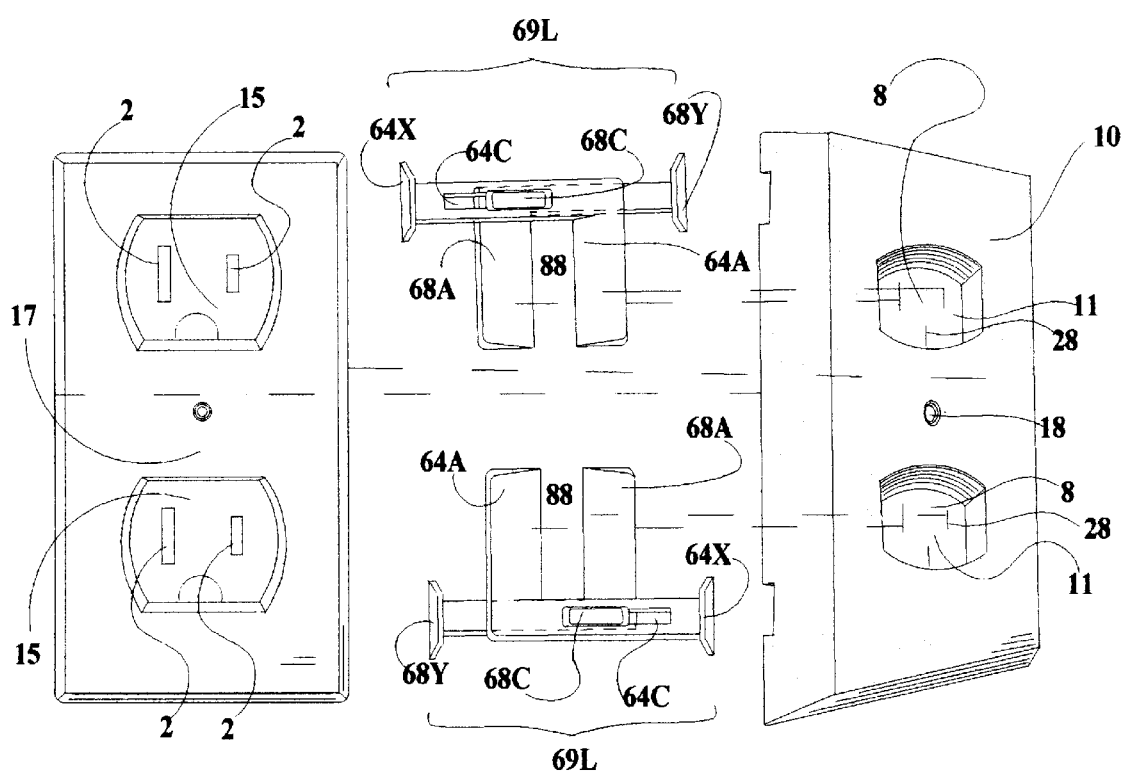
FIG. 1 shows a typical embodiment of a perspective exploded view of the invention embodying each of the main parts of the invention.

Specifically, the typical, preferred embodiment of the invention, illustrative of the best mode that the applicant has calculated, is shown in FIG. 1. The invention main body 10 is composed of material that can be repeatedly compressed without structural damage; polyolefin, polyethylene, closed cell foam, cellulae elastomer, or thermoplastic elastomer type of insulating material. The main body 10 surrounds the electrical outlets 15 with approximately ¾" thickness of insulating material, further forming hollow openings 8 thus exposing thinner layers 11 manufactured from the same material as the main body and connected therewith, located at the base of the plug-access, hollow openings 8. Said thinner layers 11 cover the female electrical elements 2 of the electrical outlets 15, may be repeatedly compressed without structural damage, and have slits 28 that correspond to the width and location of the female electrical elements 2 of the electrical outlet 15. The slits 28 do not completely perforate the layer 11. In the typical embodiment, the main body 10, forming two hollow openings 8, and layers 11 of the invention, are constructed as one piece. In the typical embodiment, the layer 11 covering each of the female electrical elements 2 is approximately ⅛" thick, although may be thinner or thicker, but not so thick that a plug is forced out by the thin layer 11 when the plug is engaged with said electrical outlet 15.

As shown in FIG. 1, the typical embodiment, two movable assemblies 69L for each of the two electrical wall outlets 15, are attached to the rear or back of the main body 10, further sandwiched between the faceplate 17, further overlapped by the thin layers 11. FIG. 1 shows two movable assemblies 69L detached in this exploded view and corresponding to the upper and lower portions of the invention, further corresponding to the positions of the upper and lower female electrical elements 2 of the electrical outlet 15. In FIG. 1, specifically, the movable assemblies 69L, comprising urging extensions 64X and 68Y which are visible when the invention is attached to the electrical outlet 15, connecting interlocking means consisting of male elements 68C and female elements 64C, and covering extensions 68A and 64A, move when urged-pressed at the sides of urging extensions 64X and 68Y. But access to the female electrical elements 2 of the electrical outlet 15 is only gained if said sides of urging extensions 64X and 68Y are urged-pressed together such that covering extensions 68A and 64A are urged, thus moved, thus enlarging the gap 88, thus exposing the female electrical elements 2 of the electrical outlet 15 and allowing the insertion of a plug because said covering extensions 68A and 64A cover the female electrical elements 2 of the electrical outlet when a plug is not engaged therewith. The ground terminal does not need to be covered.

A screw hole 18 gives access to a screw of a faceplate of an electrical outlet.

When access to electricity is specifically necessary, a person squeezes urging extensions 64X and 68Y with one hand, places a plug in a hollow opening 8 with the other hand, pushes and perforates the thin layer 11 of insulating material with the plug by pushing the plug until it is fully seated. The plug may be inserted into one of the hollow openings prior to pressing the sides of the movable assemblies but the plug cannot be pushed into the outlet without urging the movable assemblies 69L. Further, the force necessary to sufficiently open the slidable assemblies is directly proportional to the manufactured size of the sides of the slidable assemblies. That is, the smaller the sides the lesser the amount of pressure necessary and the larger the sides the greater amount of pressure necessary.

When a plug that is engaged with the electrical outlet and the invention is to be removed, instead of pulling said plug out of said electrical outlet which can damage the plug-cord connection, a person pushes the compressible body of the invention with the thumb and forefinger, thus compressing the main body against the outlet faceplate. This compression of the invention in removal of the plug applies the main force against the outlet. A person then grasps the plug and removes the plug allowing the decompression of the invention to assist in removal.

Figure 2:
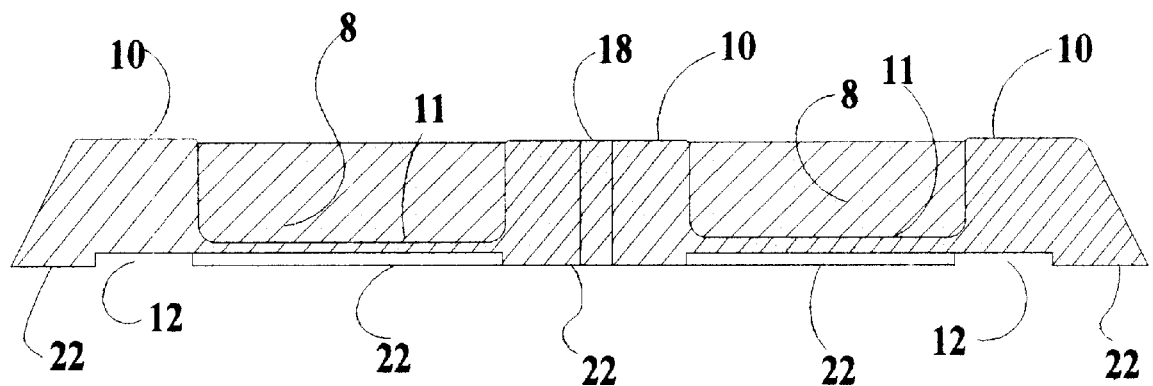
FIG. 2 shows a cutaway side view of the main body and the inner layers of the invention.

FIG. 2 shows a cutaway side view of the main body 10 and thin layers 11 without the movable assemblies. In FIG. 2, specifically, groove 12 located on the underside of the invention allows the movable assemblies or faceplate to move freely while sandwiched between the compressible insulating material and the outlet faceplate. Positions 22 show the locations where the adhesive is of fixed Further, screw access hold 18 is shown.

Figure 3:
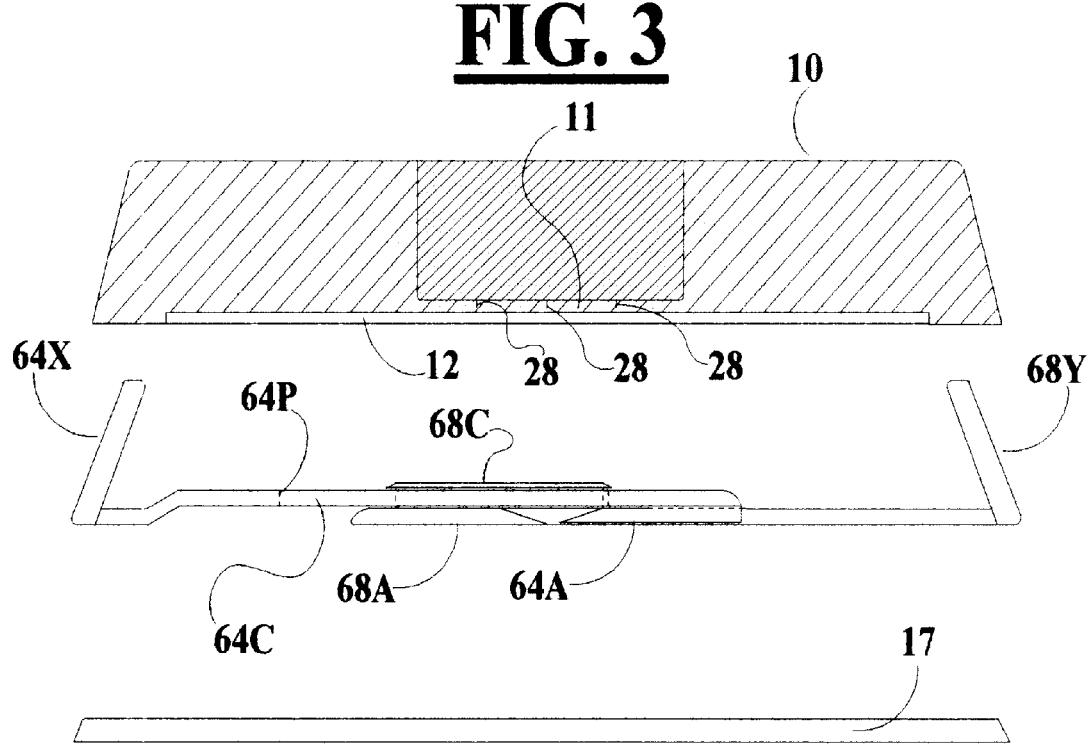
FIG. 3 shows a cutaway, exploded end view of the typical embodiment of the invention.

FIG. 3 shows a cutaway exploded end view of the typical embodiment of the invention. In FIG. 3, specifically, groove 12 further allows the movable assemblies 69L to move freely while sandwiched between the compressible insulating material of the main body 10 and the outlet faceplate 17. Protruding male element 68C is engaged with female element 64C after being snapped together during assembly. Abutment 64P limits the travel of the movable assemblies. Slits 28 show the relative positions on thin layer 11 corresponding to the positions of the female electrical elements 2 of the outlet 15.

Figure 4:
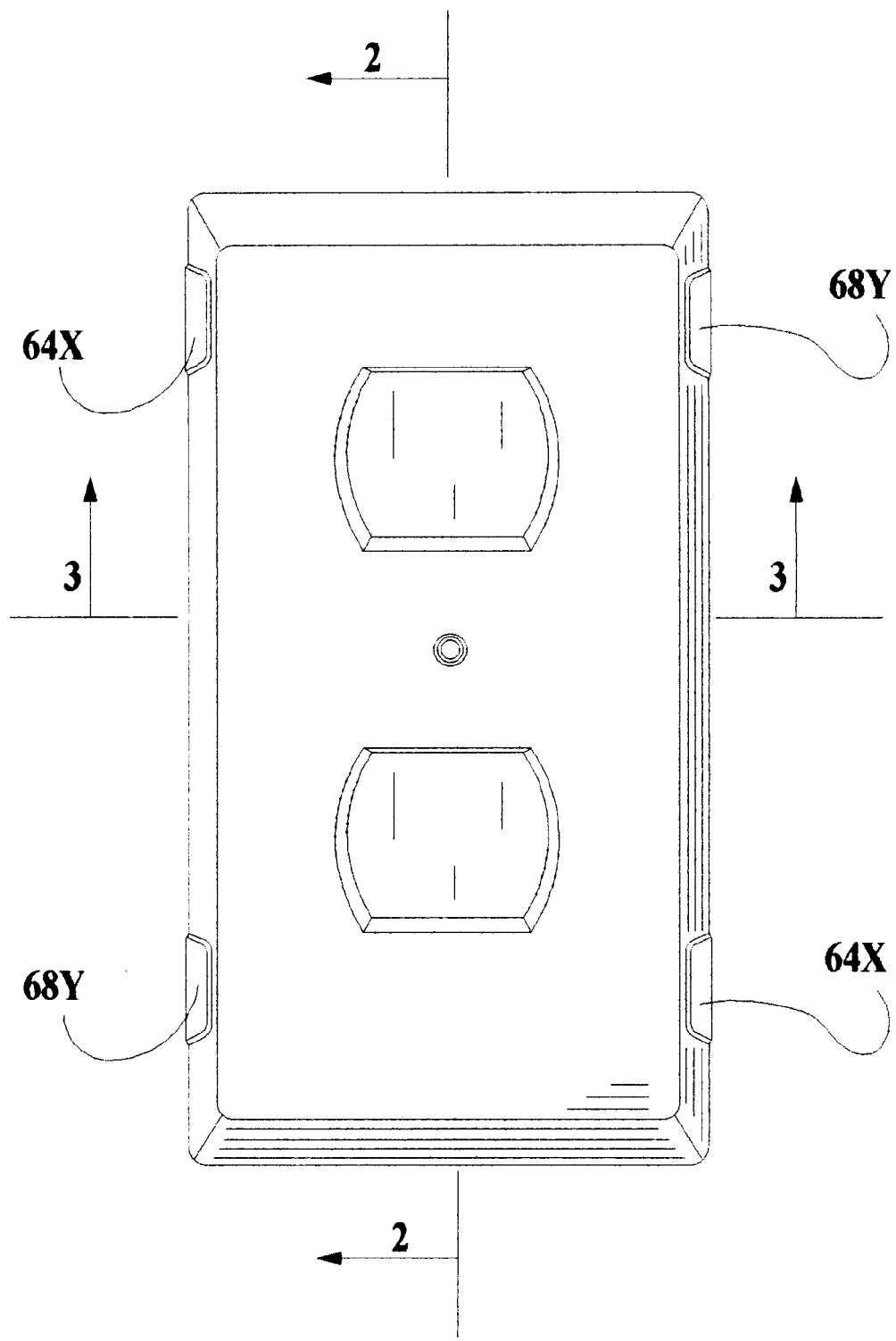
FIG. 4 shows a front view of the typical embodiment of the invention, further showing the cutaway perspectives of FIG. 2 and FIG. 3.

FIG. 4 shows a front view of the typical embodiment of the invention, further showing the relative cutaway perspectives of FIG. 2 and FIG. 3.

Figure 5:
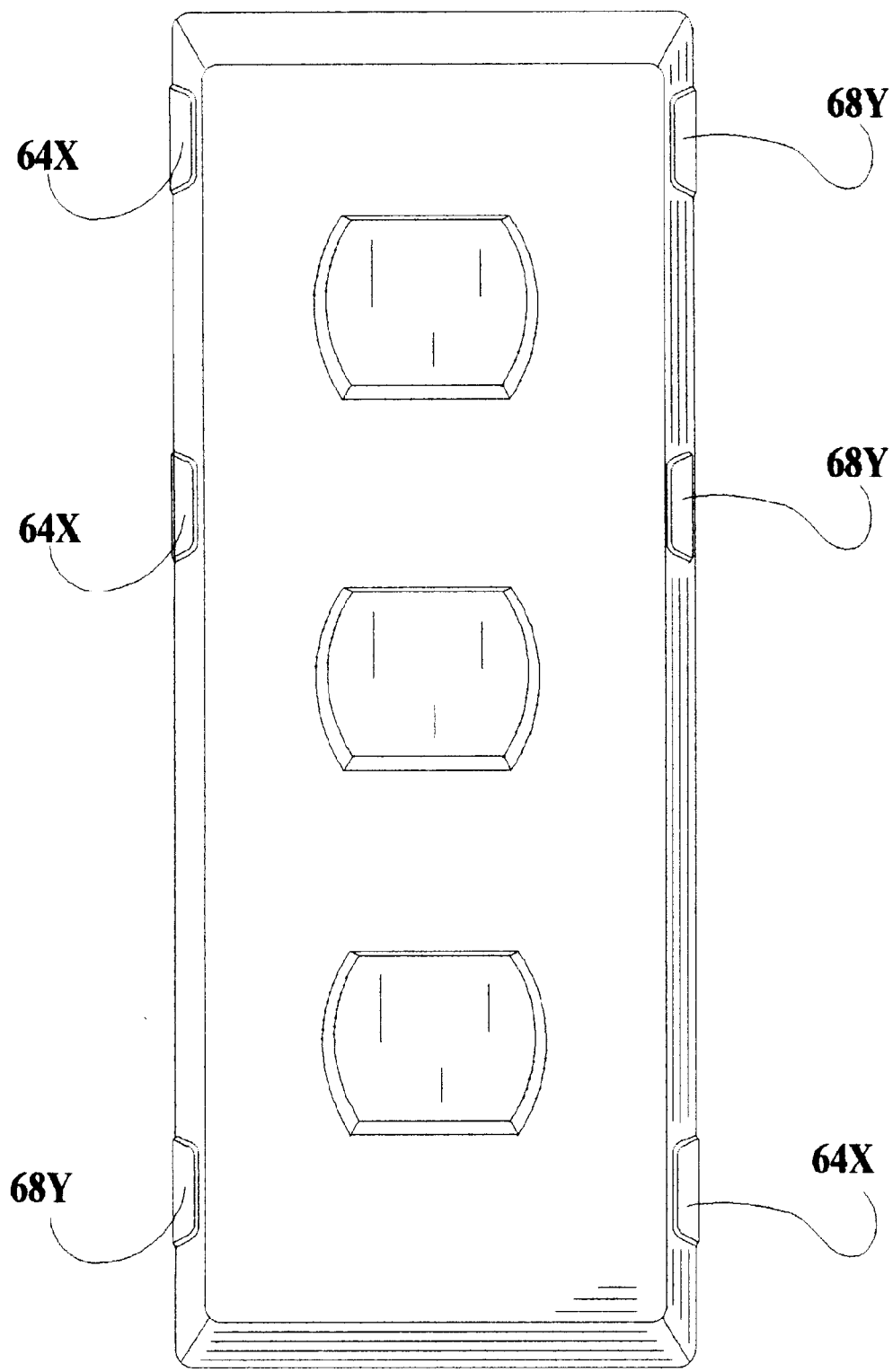
FIG. 5 shows another embodiment of the invention for a terminal strip.

FIG. 5 discloses another embodiment of the invention in which the invention is formed for terminal strip. The terminal strip version operates in the same manner as previously explained in the embodiment of FIGS. 1–4.

RAMIFICATIONS AND SCOPE OF INVENTION

The descriptions of the invention as previously mentioned contain many specificities that should not be construed to limit the scope of the invention. Some alternative applications and additional ramifications X: foreign electrical outlets that have an alternative shape, manufacture of the invention for power strips that have a multitude of outlets joined in series, etc. Further, the shape, topology, concavity, activity, color, resiliency, size, and texture, specifically, can vary in addition to the materials used to manufacture the invention. Moreover, the manufacturing process can also vary. Even further, the invention may be manufactured attached to the faceplate.

Further, there are several possibilities in the construction or composition of the invention for common electrical outlets. Additional embodiments and compositions are possible with the same level and effect of protection. The movable assemblies may be manufactured from hard rubber or other nonconductive material or may be manufactured such that they shut the gap 88, in a static state with no plug inserted into the outlet.

It is important to note that each of the parts are effective independently to a lesser degree; the invention is effective with just the compressible, main body of insulation surrounding the female electrical elements of the outlet as shown in FIG. 5, the terminal strip version; the invention is effective with only a partially slitted layer covering the female electrical elements of the electrical outlet; the invention is effective with a combination of said main body and layers without the slidable assembles. However, synergy exists when the parts are combined to form the product shown in FIG. 1.

Specifically, I claim:

1. An apparatus for covering an electrical outlet comprising:
   a faceplate;
   a body formed of a compressible insulating material having a hollow opening corresponding to a pair of female electrical elements of an electrical outlet;
   a thin layer of insulating material within said hollow opening of said body covering the female electrical elements of the electrical outlet, said thin layer of insulating material having slits only large enough to allow an electrical plug access through said slits of the thin layer of insulating material to engage with the electrical outlet;
   a moveable assembly covering each female electrical outlet including urging extensions and covering extensions, said covering extensions permitting a gap therebetween when the urging extensions are pressed, said moveable assembly being located between an electrical outlet faceplate, said body and said layer of insulating material, the covering extensions being moveable from a first position whereupon the covering extensions block access to said female electrical elements of said electrical outlet by an electrical plug, to a second position permitting access to female electrical elements of the electrical outlet by said electrical plug and wherein the gap between the covering extensions is widened, said covering extensions being moved from said first position to said second position when the urging extensions are pressed together toward each other, and the covering extensions move from the second position to said first position when the body of insulated material and the faceplate are compressed as the plug is removed, thereby blocking access to the female electrical elements of the electrical outlet.

2. The apparatus according to claim 1 wherein said body of insulating material is formed of soft, insulation material to protect against injury by a child falling against said apparatus.

3. The apparatus according to claim 1 further comprising a thick, compressible, electrical insulator affixed to the front of an existing electrical outlet faceplate, whereby a person is protected against electrical shock.

4. The apparatus of claim 1 wherein the body is made of thick, compressible, insulating material surrounding the outlet, further having a hollow opening corresponding to each set of female electrical elements of the electrical outlet.

5. The apparatus of claim 1 wherein the body is made of material consisting of polyolefin, polyethylene, cellulae elastomer, thermoplastic elastomer, or closed cell foam type of insulating material of a predetermined size.

6. The apparatus according to claim 1 wherein said thin layer of insulating material with the hollow opening covering the female electrical elements of the electrical outlet is penetrable and thin enough to allow the electrical plug sufficient access to female electrical elements of the electrical outlet upon penetration of the thin layer of insulating material by the plug.

7. The apparatus of claim 1 wherein said slits only partially penetrate said insulating thin layer thereby maintaining a complete seal over the outlet until perforated.

8. The apparatus according to claim 1 further comprising insulating, rigid extensions affixed to an electrical outlet faceplate, covering a set of female electrical elements of said electrical outlet, prohibiting electrical plug access to the electrical outlet until being urged apart, thus allowing the plug access to the outlet, whereby a person is protected against electrical shock.

9. The apparatus of claim 8 comprising:
   (a) a plurality of covering extensions of substantially sufficient length and size to physically cover a set of female electrical elements of an electrical outlet;
   (b) a plurality of urging extensions of substantially sufficient length and size to physically enable a person to urge the covering extensions apart;
   (c) a substantial means for joining the covering extensions apart and the urging extensions.

10. The apparatus of claim 8 wherein the rigid extensions are narrow enough to allow the electrical plug sufficient access to the female elements of the electrical outlet when the rigid extensions are urged apart, thus allowing the rigid extensions to make contact with the metal prongs of the plug thereby completely protecting a person from shock from the electrical outlet.

* * * * *